US012625273B2

(12) United States Patent
Lenzarini et al.

(10) Patent No.: US 12,625,273 B2
(45) Date of Patent: May 12, 2026

(54) METHOD FOR DETERMINING POSITIONS OF A PLURALITY OF TERMINAL DEVICES BY A SERVER

(71) Applicant: u-blox AG, Thalwil (CH)

(72) Inventors: Davide Lenzarini, Thalwil (CH); Hamed Siasi, Thalwil (CH)

(73) Assignee: u-blox AG, Thalwil (CH)

( * ) Notice: Subject to any disclaimer, the term of this patent is extended or adjusted under 35 U.S.C. 154(b) by 185 days.

(21) Appl. No.: 18/474,398

(22) Filed: Sep. 26, 2023

(65) Prior Publication Data

US 2024/0111059 A1    Apr. 4, 2024

(30) Foreign Application Priority Data

Sep. 30, 2022    (EP) ..................................... 22199123

(51) Int. Cl.
*G01S 19/03* (2010.01)
*G01S 19/14* (2010.01)

(52) U.S. Cl.
CPC .............. *G01S 19/03* (2013.01); *G01S 19/14* (2013.01)

(58) Field of Classification Search
CPC .................................. G01S 19/03; G01S 19/14
USPC ....................................................... 342/357.4
See application file for complete search history.

(56) References Cited

U.S. PATENT DOCUMENTS

2011/0201360 A1* 8/2011 Garrett .................. H04W 4/029
                                                    455/457
2015/0148055 A1    5/2015 Alles et al.

2018/0024247 A1    1/2018 Carter
2020/0128486 A1    4/2020 Herrmann
2024/0004088 A1*   1/2024 Greiff ..................... G01S 19/51

FOREIGN PATENT DOCUMENTS

EP           2237577 A1    10/2010
EP           2360971 A2 *   8/2011    ............ H04W 48/10

OTHER PUBLICATIONS

Extended European Search Report in European Appln. No. 22199123. 5, mailed on Mar. 29, 2023, 10 pages.

* cited by examiner

*Primary Examiner* — Harry K Liu

(74) *Attorney, Agent, or Firm* — Fish & Richardson P.C.

(57) ABSTRACT

A method for determining positions of a plurality of terminal devices by a server includes receiving by the server from the terminal devices, each allocated to one of predetermined one or more clusters, first global navigation satellite system (GNSS) information according to predetermined transmission patterns of the terminal devices, and second GNSS information at random. The method includes collecting context related data from one or more context sources, and updating, by the server, the set of predetermined clusters based on a part of the context related data and the first and the second GNSS information and a predetermined criteria of cluster's level of accuracy. The method further includes determining, by the server, based on the first and the second GNSS information and on the updated clusters, respective positions of the clusters and individual positions of the terminal devices according to the respective positions of the clusters.

20 Claims, 5 Drawing Sheets

METHOD FOR DETERMINING POSITIONS OF A PLURALITY OF TERMINAL DEVICES BY A SERVER

CROSS-REFERENCE TO RELATED APPLICATION(S)

This application claims priority to European Application No. 22199123.5, filed on Sep. 30, 2022, the contents of which are incorporated herein by reference in their entirety.

TECHNICAL FIELD

This disclosure relates to a method for determining positions of a plurality of terminal devices by a server. The disclosure further relates to a server and a plurality of terminal devices.

BACKGROUND ART

In many applications, terminal devices are able to receive positioning information, such as global navigation satellite system, GNSS, information. For example, sensors of Internet of Things, IoT, are equipped with GNSS receiving capability to obtain GNSS positions of themselves. Such sensors can be attached with moving objects to track the positions of the moving objects. For example, the sensors are attached to livestock or wild animals to track their positions. In such applications, a server communicates with the sensors to obtain the positions or raw GNSS satellite measurements (such as the ones used for the Radio Resource Location services Protocol, RRLP), to allow the position determination by the server, of the animals for further use. For example, the positions are read by an end user who supervises the animals, or sent to further application servers.

As the animals move, the amount of position data transmitted to the server can be substantial. As the terminal devices such as the sensors attached to the animals are typically operated with batteries, constant transmission of position data can quickly drain out the batteries and the replacement of batteries is frequently required. Therefore, in such conventional applications, the operation and maintenance cost of such applications is relatively high.

SUMMARY OF INVENTION

An object to be achieved is to provide an improved concept for determining positions of a plurality of terminal devices by a server with satisfactory accuracy and low operation cost.

This object is achieved with the subject-matter of the independent claims. Embodiments and developments derive from the dependent claims.

According to the present disclosure, a server communicates with a plurality of terminal devices which are capable of collecting GNSS information. The terminal devices are allocated to predetermined clusters and assigned with predetermined transmission patterns for at least a part of the collected GNSS information. The server receives GNSS information transmitted according to the transmission patterns of the terminal devices and GNSS information transmitted from the terminal devices at random. Based on these GNSS information, and based on some context related data, such as social rules, maps, time of the day and weather data, the server updates the clusters to target at a predetermined level of accuracy, and determines respective positions of the clusters and individual positions of the terminal devices according to the respective positions of the clusters.

The improved concept for determining positions of a plurality of terminal devices by a server is based on the idea that the clusters are determined and updated to best represent the individual positions of the terminal devices with a satisfactory accuracy. For example, a plurality of terminal devices are attached to livestock or wild animals which share common social behavior and are likely to move in common manners. GNSS information of the terminal devices are likely to show correlations or similarities among the terminal devices. Transmitting the GNSS information of all the terminal devices is redundant, if the accuracy of the positions of the individual terminal devices has a tolerance range. Considering the tolerance range of the accuracy, clusters are determined among the terminal devices and each terminal device is allocated in a cluster. The positions of the terminal devices in a same cluster is represented by the position of the cluster, e.g., a central position of the cluster. Not all terminal devices need to transmit their individual GNSS information, or do not need to transmit their individual GNSS information constantly. As the positions of the terminal devices may change dynamically with the animals' movements, the accuracy of the represented positions is verified by comparing the individual GNSS information sent randomly from the terminal devices and the positions of their clusters. If the accuracy exceeds the tolerance range, the clusters are updated to reflect changed positions of the terminal devices.

By means of the improved concept for determining positions of a plurality of terminal devices by a server, redundant transmission of GNSS information from terminal devices is avoided, thus the operation and maintenance cost is reduced significantly, while a satisfactory accuracy of the positions of individual terminal devices is ensured.

According to the present disclosure, the method for determining positions of a plurality of terminal devices by a server comprises that each of the plurality of terminal devices is allocated to one of predetermined one or more clusters and assigned with a respective predetermined transmission pattern, the server receives from at least one of the plurality of terminal devices first GNSS information according to predetermined transmission patterns. The predetermined transmission patterns e.g. indicate the terminal devices when to send the first GNSS information to the server. Respective transmission patterns of each terminal device may be different to each other. For example, some terminal devices send the first GNSS information more frequently, while some terminal devices send the first GNSS information less frequently, or do not send the first GNSS information for an indicated period of time. Meanwhile, the server receives from at least one of the plurality of terminal devices second GNSS information sent at random. The second GNSS information is sent in addition to the first GNSS information and completely randomly by the terminal devices. It may thus appear randomly that some terminal devices send more of the second GNSS information while some terminal devices send rare or no second GNSS information for a period of time.

The method further comprises that the server collects context related data from one or more context sources. For example, the server collects maps and weather data from maps and weather service applications. Based on at least a part of the context related data and the first and the second GNSS information and a predetermined criteria of cluster's accuracy, the server updates the set of predetermined one or more clusters by allocating each terminal device to one cluster. For example, a predetermined criteria of cluster's accuracy may be a tolerance range of an accuracy of positions of the clusters compared with actual individual positions of the terminal devices allocated in respective clusters. If the accuracy exceeds the tolerance range, the clusters are updated. For example, some clusters may cover more or less terminal devices, some clusters may vanish, some clusters may be combined to form a new cluster, or some new clusters appear in addition to existing clusters. In such example cases, some terminal devices may be allocated to a different existing cluster, or to a new cluster. If the accuracy does not exceed the tolerance range, the clusters may not be changed and the terminal devices may stay in the respective allocated clusters.

The method further comprises that the server determines respective positions of the one or more clusters based on the first and the second GNSS information and on the updated one or more clusters of the plurality of terminal devices. Based on the second GNSS information and on the updated one or more clusters, the accuracy of positions of the updated clusters compared with actual individual positions of the terminal devices is ensured. A respective position of each cluster is a central position of the cluster based on the first GNSS information of the terminal devices in the cluster. The server further obtains individual positions of the plurality of terminal devices according to the respective positions of the one or more clusters. For example, an individual position of a terminal device is the position of the cluster in which the terminal device is allocated.

The server may obtain from the terminal devices directly the positions or raw GNSS satellite measurements (in a format like RRLP), a power efficient snapshot of the measured codephase and/or doppler data for each visible GNSS satellite with signal acceptable for a certain quality criteria. In the latter case, the terminal devices may minimize the power consumption and the server may calculate the terminal device positions making use of GNSS assistance and GNSS augmentation data.

By means of the method for determining positions of a plurality of terminal devices, redundant transmission of GNSS information from terminal devices is avoided while a satisfactory accuracy of their positions is still provided, thus the operation and maintenance cost is reduced without sacrificing user experience.

In some implementations, the procedure in the method is repeatedly performed. Depending on the dynamicity of the movement of the terminal devices, the accuracy of the clusters is verified every period of time based on the second GNSS information freshly sent by the terminal devices at random, so the clusters are updated every period of time consequently and the updated clusters can reflect updated positions of the terminal devices every period of time.

In some implementations, the method for determining positions of a plurality of terminal devices further comprises that, based on at least a part of the context related data and the updated one or more clusters, the server updates the respective predetermined transmission patterns for at least one of the plurality of terminal devices for transmitting the first GNSS information. For example, the clusters are updated and some terminal devices may be re-allocated to different clusters or new clusters. And considering additionally some context related data, such as time of the day, the transmission patterns of some terminal devices may be changed, to reduce or stop transmission of the first GNSS information, or start to transmit the first GNSS information instead of some other terminal devices. The server provides the respective updated transmission patterns to each of the at least one of the plurality of terminal devices. In some examples, the transmission pattern of any terminal device may be not changed, and thus there is no updated transmission pattern to be provided to the terminal devices. With the updated transmission patterns, the terminal devices only transmit the first GNSS information according to the updated transmission patterns instead of constant transmission, thus the transmission power and the usage of the transmission bandwidth are significantly reduced. Furthermore, the terminal devices may use the transmission patterns to maximize the sleep time and so minimize the overall power consumption. The transmission patterns are updated by the server, so that the first GNSS information can reflect timely the positions of the terminal devices in the updated clusters.

In some further implementations, the server receives battery levels of at least one of the plurality of terminal devices in addition to the first or the second GNSS information. For example, one or more terminal devices send their respective battery levels together with the first GNSS information which is sent according to their respective transmission patterns, or one or more terminal devices send their respective battery levels together with the second GNSS information which is sent at random. Based on at least a part of the context related data, the updated one or more clusters and additionally the battery levels, the server updates the respective predetermined transmission patterns for at least one of the plurality of terminal devices for transmitting the first GNSS information. For example, in addition of considering that some terminal devices may be re-allocated to different clusters or new clusters and considering some context related data, such as time of the day and/or maps and/or social rules, the server considers, in combination with battery levels of the terminal devices, to potentially reduce the transmission of some terminal devices with lower battery levels and instead to obtain the first GNSS information from some terminal devices with higher battery levels. In such way, the battery levels are balanced across the terminal devices, and the replacement of batteries of the terminal devices may be scheduled at a common time point instead of performing the battery replacement process repeatedly. Hence, the maintenance cost is further reduced.

In some implementations, the server receives third GNSS information from the plurality of terminal devices and predetermines the predetermined one or more clusters and the predetermined transmission patterns of the plurality of terminal devices based on at least a part of the context related data and the third GNSS information. For example, the server determines the clusters that can optimally reflect the positions of the terminal devices according to the individual positions provided in the third GNSS information and at least a part of the context related data, and determines optimally some of the terminal devices to transmit the first GNSS information based on the clusters and some context related data, such as maps, social rules and owner instructions. By such predetermination that may be performed in a setup or calibration phase, the clusters are optimally determined to reflect the positions of the terminal devices in respective clusters, and the transmission of the first GNSS information is optimized to reduce redundant transmissions. Hence, the operation cost is significantly reduced since the beginning.

In some implementations, the context related data may include data of at least one of: GNSS assistance, GNSS augmentation, maps, weather, news, social rules, threats and owner instructions, from the one or more context sources including at least one of: content providers in the Internet, end users, global navigation satellite systems. For instance, depending on the applications and/or the time of the day and/or terminal devices relative positions, the server may be configured to select the context data that are related to the applied scenarios. For example, for tracking livestock or wild animals, animals may share common social behavior and are likely to move in common manners in a certain period of time during a day, or in certain weather conditions. Time of the day and current and/or forecast weather data may be selected by the server as the context related data for updating or predetermining clusters and transmission patterns. With the context related data, clusters can be more efficiently identified and more likely adapted to change accordingly in the certain period of time or in the certain weather conditions, the accuracy of the clusters can be improved and the operation cost can be further reduced.

In some implementations, when updating the one or more clusters of the plurality of terminal devices, the server identifies a correlation between at least a part of the context related data and the first and the second GNSS information using at least one of a machine learning algorithm and an analytical algorithm. For example, a correlation is identified between the time of the day and/or the weather conditions and/or social rules and the positions of the terminal devices based on the first and the second GNSS information. A machine learning algorithm may be performed to identify the clusters after a training phase, or an analytical algorithm may be performed to compute correlation parameters and identify the clusters. With the identified correlation, the clusters are optimally determined with the context related data and the positions of the terminal devices, positions of the cluster can thus efficiently and optimally reflect individual positions of the terminal devices in the clusters. The operation cost is further reduced.

In some implementations, when predetermining the predetermined one or more clusters of the plurality of terminal device, the server may identify a correlation between at least a part of the context related data and the third GNSS information using at least one of a machine learning algorithm and an analytical algorithm.

In some implementations, when updating the set of predetermined one or more clusters, the server further determines respective validity durations for at least one of the updated one or more clusters. For example, the server considers the dynamicity of the movement of the terminal devices based on context related data and the first and the second GNSS information, and determines a longer or a shorter validity duration during which positions of the individual terminal devices in a cluster are considered relatively static. The transmission patterns are updated based on the updated one or more clusters and at least a part of the context related data. The server associates the respective validity durations with the transmission patterns of the terminal devices of the at least one of the one or more clusters and provides the associated validity durations in addition to the transmission patterns to the terminal devices. Given the validity durations and the associated transmission patterns, some terminal devices that are not assigned to transmit the first GNSS information can maximize the duration of a sleep status to further save battery consumption.

In some implementations, when predetermining the predetermined one or more clusters of the plurality of terminal device, the server may further determine respective validity durations for at least one of the predetermined one or more clusters, associate the respective validity durations with the predetermined transmission patterns of the terminal devices of the at least one of the one or more predetermined clusters and provide the associated validity durations in addition to the predetermined transmission patterns to the terminal devices.

In some implementations, the transmission pattern of each of the plurality of terminal devices includes at least a transmission interval for transmitting the first GNSS information. For example, a transmission pattern with a transmission interval indicates a terminal device to transmit the first GNSS information at each transmission interval. Transmission patterns among different terminal devices may be different. In some implementations, a transmission pattern may be none, or a transmission interval may be set to none or infinite, to indicate that a terminal device does not transmit the first GNSS information or just once until an eventual transmission pattern update. With the transmission intervals, terminal devices can further save battery consumption as they can optimize the schedule of sleep intervals.

In some implementations, the criteria of cluster's accuracy is a target of the accuracy of the determined individual positions set by an end user. For example, an individual position of a terminal device is represented by the position of a cluster to which it is allocated. The difference between the position of the cluster and the actual position of the terminal device can be used to evaluate the accuracy of the cluster. A target of the accuracy of the determined individual position may be an upper limit of the difference between the position of the cluster and the actual position of the terminal device. In some implementations, the target of the accuracy, i.e., the upper limit of the difference is a distance in terms of meters. End users may set the target of the accuracy depending on the applications. For example, in some applications, the target of the accuracy may have a looser tolerance range, i.e., bigger differences can be tolerated by the end users among the positions of the clusters and the actual positions of the terminal devices respectively allocated to them. Further reduction of transmission of the first GNSS information is thus allowed, and the operation cost is further reduced.

In some implementations, when obtaining individual positions of the plurality of terminal devices according to the positions of the one or more clusters, the server may store locally the individual positions of the plurality of terminal devices. In addition or as an alternative the server may publish the individual positions of the plurality of terminal devices to an external server, for example, a web server, a blockchain, an MQTT broker for IoT, and so on. Further in addition or as an alternative the server may provide the individual positions of the plurality of terminal devices to an end user on demand. The individual positions of the plurality of terminal devices may be used for various applications.

The present disclosure further provides a computing apparatus according to the improved concept for determining positions of a plurality of terminal devices by a server. For example, for performing the respective actions in the method for determining positions of a plurality of terminal devices by a server, a computing apparatus can be configured as a server comprising a processing unit and a communication unit for communicating with a plurality of terminal devices. The communication unit of the computing apparatus is configured to receive from at least one of the plurality of terminal devices, wherein each terminal device is allocated to one of predetermined one or more clusters, first GNSS information according to predetermined transmission patterns of the plurality of terminal devices, and from at least one of the plurality of terminal devices second GNSS information at random. The communication unit of the computing apparatus is further configured to collect context related data from one or more context sources. The processing unit of the computing apparatus is configured to update the set of predetermined one or more clusters by allocating each terminal device to one cluster based on at least a part of the context related data and the first and the second GNSS information and a predetermined criteria of cluster's accuracy. The processing unit of the computing apparatus is further configured to determine, based on the first and the second GNSS information and on the updated one or more clusters of the plurality of terminal devices, respective positions of the one or more clusters, and obtain individual positions of the plurality of terminal devices according to the respective positions of the one or more clusters.

In some implementations, the processing unit of the computing apparatus is further configured to update based on at least a part of the context related data and the updated one or more clusters, the respective predetermined transmission patterns for at least one of the plurality of terminal devices for transmitting the first GNSS information. The communication unit of the computing apparatus is further configured to provide the respective updated transmission patterns to each of the at least one of the plurality of terminal devices.

Further implementations of the computing apparatus become readily apparent from the various implementations described above in conjunction with the method.

The present disclosure further provides a terminal device in a plurality of terminal devices according to the improved concept for determining positions of the plurality of terminal devices by a server. For example, for performing the respective actions in the method for determining positions of the plurality of terminal devices by a server, each terminal device of the plurality of terminal devices is configured to receive a respective transmission pattern, collect GNSS information and transmit the collected GNSS information according to the transmission pattern and at random to the server. Further implementations of such terminal device become readily apparent from the various implementations described above in conjunction with the method.

A system according to the improved concept may comprise a computing apparatus configured according to one of the above implementations and a plurality of terminal devices configured according to one of the above implementations. The computing apparatus and the terminal devices may communicate with each other in at least one of several communication networks, such as Bluetooth networks, WiFi networks, Thread networks, LoRaWAN networks, 3GPP-compliant mobile networks, satellite networks.

Further implementations and developments in the system become readily apparent for the skilled reader from the various implementations described above in conjunction with the method, the computing apparatus and the terminal device.

According to one embodiment of the improved concept, a computer program comprises instructions that may be stored in a preferably non-transitory computer-readable storage medium, when the instructions are executed on two or more processors of at least a computing apparatus and a terminal device, the instructions enabling the two or more processors to execute a method according to one of the implementations described above.

BRIEF DESCRIPTION OF DRAWINGS

The improved concept will be explained in more detail in the following with the aid of the drawings. Elements and functional blocks having the same or similar function bear the same reference numerals throughout the drawings. Hence their description is not necessarily repeated in the following drawings.

In the drawings.

DETAILED DESCRIPTION

Figure 1:
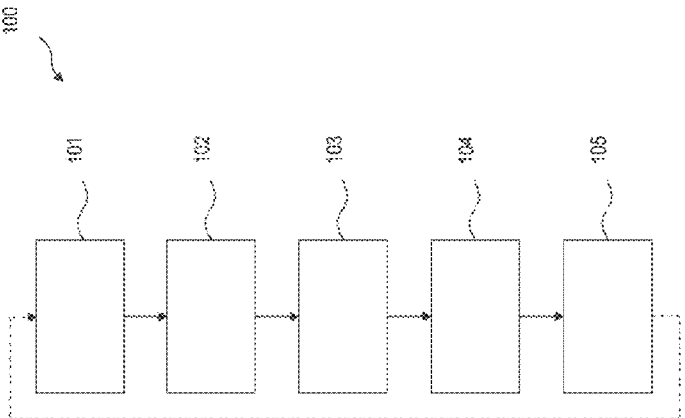
FIG. 1 shows a flowchart of a method for determining positions of a plurality of terminal devices by a server.

FIG. 1 shows a flow diagram of an example implementation of a method 100 for determining positions of a plurality of terminal devices by a server.

In the example implementation of method 100, a plurality of terminal devices is deployed in an area, and may be attached with moving objects, such as livestock or wild animals. The terminal devices are able to receive GNSS signals. The terminal devices may be powered by batteries. A server can communicate with the plurality of terminal devices for tracking the positions of the terminal devices, and thus tracking the positions of the moving objects such as the animals. The terminal devices are allocated to a set of predetermined one or more clusters, and each terminal device is assigned with a predetermined transmission pattern for transmitting first GNSS information.

A cluster is a group of terminal devices that exhibit a collective behavior regarding their position. For instance, devices mounted on livestock or wild animals with social attitude.

Figure 2B:
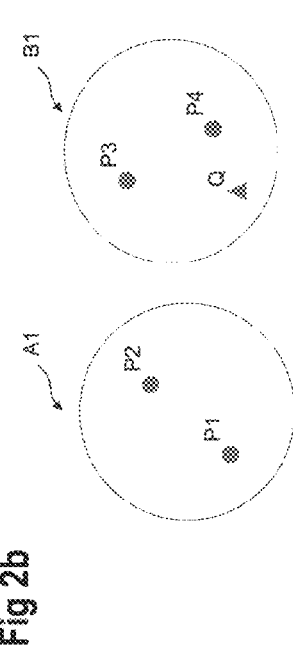
FIG. 2b, 2c, 2d show examples of updated clusters.
Figure 2D:
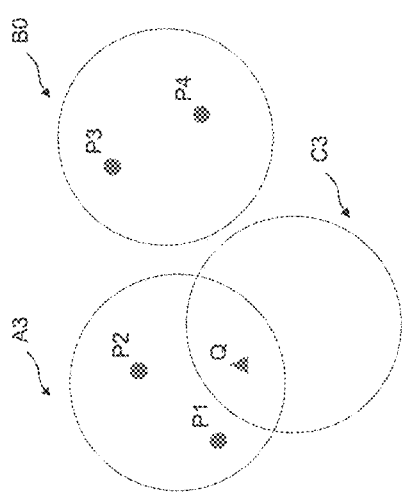
Figure 2A:
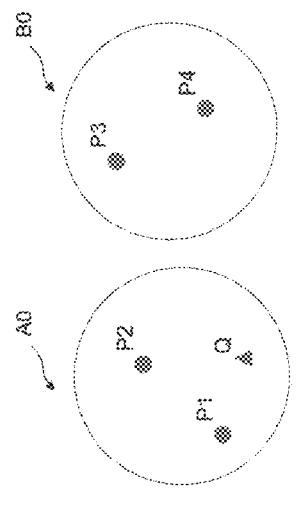
FIG. 2a shows an example of predetermined clusters.

FIG. 2a shows an example set of predetermined clusters of terminal devices. Positions of terminal devices P1, P2, P3, P4 and Q may be available. Depending on the terminal devices' positions and/or at least a part of the context related data, two clusters are predetermined. Three terminal devices P1, P2 and Q are allocated to cluster A0, the other two terminal devices P3 and P4 are allocated to cluster B0. For instance, the allocation of P1,P2 and Q to the cluster A0 and the allocation of P3 and P4 to the cluster BC may be related to the fact that, if the terminal devices' positions are available, P1, P2 and Q are close to each other and also P3 and P4 are close to each other, or it may be related to the fact that P1, P2 and Q are installed on the same components of an animal's family or on members of the same flock on the basis of the information collected from the owner of the assets to track. In some examples, there may be only one cluster being predetermined, or more than two clusters. There may be only one terminal device in a cluster, or more than one terminal devices in a cluster.

In an example embodiment, the predetermination of the two clusters may be performed by an end user by a manual assignment, for example, by roughly assigning the terminal devices to the clusters according to their positions and/or according to context related data, like some social rules in case of livestock or wild animals.

In another example embodiment, the predetermination of the two clusters may be performed by the server. Before predetermining clusters, the server receives GNSS information from all the terminal devices in the area to obtain their actual positions. The server further collects context related data, such as a map of the area in which the terminal devices are located, a set of social rules (for instance in case of livestock or wild animals) and owner instructions. Based on the GNSS information, i.e., the positions of all the terminal devices and the context related data, the server for instance predetermines the two clusters that minimize for each terminal device the difference between its actual position and the position of the cluster to which it is allocated. Moreover, based on the GNSS information and the same or different context related data, such as the time of the day and/or the weather conditions, and according to the two clusters, the server further predetermines transmission patterns of the terminal devices. Each transmission pattern of the terminal devices may be different from each other. A transmission pattern indicates a terminal device to transmit GNSS information at certain times, for example, regularly at every time interval. With different transmission patterns among terminal devices, some terminal devices transmit GNSS information more frequently, while some terminal devices transmit less frequently, and some terminal devices may not need to transmit regularly. However, it may be common that at least one terminal device in each cluster transmits GNSS information regularly.

Referring back to FIG. 1, in step 101, the server receives GNSS information sent from the terminal devices according to predetermined transmission patterns and GNSS information sent from the terminal devices at random. For example, the terminal devices in FIG. 2a send GNSS information to the server according to their assigned transmission patterns regularly. As the transmission patterns among the terminal devices may be different, the server may only receive regular GNSS information from some of the terminal devices. In addition, all terminal devices in FIG. 2a may send GNSS information at random. Some terminal devices may send GNSS information regularly at time intervals according to their transmission patterns, some terminal devices instead may only send GNSS information at random. It is possible that, in a certain period of time, some terminal devices may not send GNSS information.

In step 102, the server collects context related data from one or more context sources. The moving objects such as animals to which the terminal devices are attached may show common trend of movement with respect to certain context data. GNSS assistance, GNSS augmentation, maps, weather, time, news, social rules, threats and owner instructions, or any other context data that would have correlation with the movement trends of the terminal devices can be taken as context related data by the server. Such data may be acquired from various sources, such as content and application providers in the Internet, end users, global navigation satellite systems.

In some embodiments of method 100, step 101 may be carried out before or after step 102, or steps 101 and 102 may be carried out in a same time frame.

In step 103, the server updates the predetermined clusters based on a part of the context related data, both the GNSS information sent regularly according to transmission patterns and sent at random, and a predetermined criteria of cluster's accuracy. As the terminal devices may move with the attached moving objects such as the animals, the clusters may be dynamically updated considering the related factors. For example, the server may observe that the movement is well correlated with the time of the day or the weather conditions, the time and the weather are selected by the server as leading context parameters to consider in updating the clusters. The server uses the GNSS information to obtain the positions of the clusters, meanwhile uses the GNSS information of terminal devices sent at random to verify whether the accuracy of the clusters is acceptable. The difference between the positions of the clusters and the positions of respective terminal devices sent at random is evaluated by a criteria of cluster's accuracy. The criteria may be an upper limit of the difference in terms of meters. A criteria may be set by an end user. For example, an end user may set a target of the accuracy that the difference may not exceed an upper limit in terms of meters. All these related factors are considered by the server, to determine whether the clusters need to be updated, and how to optimally update the clusters.

Figure 2C:
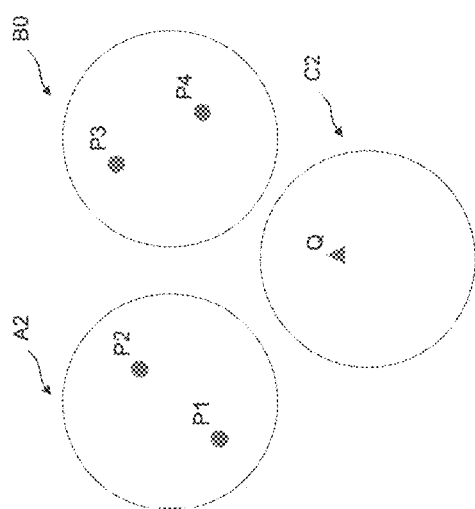

Examples of updated clusters are shown in FIGS. 2b, 2c and 2d. After a period of time, the server receives GNSS information from terminal device Q at random, and discovers that the difference between the position of terminal device Q and the position of its cluster A0 exceeds an upper limit set by the end user, for example, 20 meters. In the example in FIG. 2b, terminal device Q moves closer to terminal devices P3 and P4. The server updates the clusters and terminal device Q is allocated to cluster B1. In the example in FIG. 2c, terminal device Q moves farther away from terminal devices P1/P2 and P3/P4. The server updates the clusters and terminal device Q is allocated to a new cluster C2.

In another example in FIG. 2d of updated clusters starting from the set of clusters in FIG. 2a, animals attached with terminal devices P1, P2 and Q are part of the same animal family, but after a period of time the animal attached with terminal device Q reaches the maturity to leave the original family. In this case, the server updates the clusters and terminal device Q is allocated to a new cluster C3. It is important to point out that the clusters, shown as circles in FIGS. 2a-2d whose radius represent the cluster accuracy, may overlap (clusters A3 and C3 overlap with each other) as the clusters don't represent a tessellation of the surface but instead set of terminal devices with correlated positions.

Referring back to FIG. 1, in step 104, the server determines respective positions of the clusters based on the GNSS information sent regularly according to transmission patterns and sent at random, and on the updated clusters. The position of a cluster may be determined as the central position of the cluster. The central position of the cluster is derived from the GNSS information of the terminal devices in the cluster.

In step 105, the server obtains individual positions of the plurality of terminal devices according to the respective positions of the clusters. As the updated clusters are optimally determined based on the related factors, the difference between the positions of the terminal devices and the positions of respective clusters can be within the upper acceptable limit. The positions of the terminal devices can thus be represented by the positions of respective clusters to which they are allocated, even they do not transmit their GNSS information to the server, and such positions of the terminal devices can still provide a satisfactory level of accuracy.

The method 100 can be performed continuously, such that the method starts over with step 101 by receiving further GNSS information and each iteration is called an epoch. The frequency of updating the clusters depends on the dynamicity of the movement of the terminal devices, the dynamicity of the context related data, and the requirement of cluster's accuracy. The lower dynamicity and the lower requirement, the less frequently updating of the clusters.

In some embodiments of method 100, after the clusters are updated, the server updates the respective predetermined transmission patterns for the terminal devices based on a part of the context related data and the updated clusters. For example, in the example updated clusters of FIG. 2b, as terminal device Q is added in cluster B1 compared with cluster BC in FIG. 2a, three terminal devices, P3, P4 and Q are in cluster B1, and the transmission patterns of the three terminal device may be updated by the server to optimally determine the position of cluster B1. If the transmission patterns of some terminal devices are updated, the updated transmission patterns are provided to respective terminal devices. In some further embodiments, if the terminal devices can be easily reached via a 3GPP-compliant mobile network, for example, implemented with Extended Discontinuous Reception (eDRX) feature, transmission patterns may not need to be provided to such terminal devices. Instead, the server triggers such terminal devices to transmit GNSS information at assigned times.

In some embodiments of method 100, when determining transmission patterns by the server, for example, when predetermining or updating transmission patterns, the server may receive battery levels of the terminal devices in addition to GNSS information. For example, the battery level of a terminal device is sent together with the GNSS information when the terminal device sends GNSS information according its transmission pattern or at random. In addition to a part of the context related data and the updated one or more clusters, the server determines transmission patterns also based on the battery levels.

Terminal devices with lower battery levels may not be assigned to transmit frequent GNSS information, or may not be assigned to transmit at all. For example, in the example predetermined clusters of FIG. 2a, terminal device P3 is assigned to transmit GNSS information regularly for determining the position of cluster B0. After the clusters are updated, in the example updated clusters of FIG. 2b, when the server determines transmission patterns of the three terminal devices, the server may discover that terminal device Q has a higher battery level compared with terminals P3 and P4. For determining the position of cluster B1, the server may assign terminal device Q to transmit GNSS information regularly instead of terminal device P3. In such case, the transmission patterns of terminal device Q and P3 are updated and provided to them respectively.

When taking the battery levels into account for determining transmission patterns, a trade-off between battery saving and the accuracy of positions of the clusters can be made by end users. End users may set the importance of battery saving compared with the accuracy of the clusters.

In some embodiments of method 100, when updating the clusters or predetermining the clusters, the server identifies a correlation between a part of the context related data, for example, the selected leading context parameters such as the time and the weather, and the GNSS information. For example, there may be a correlation between the time of a day and the dynamicity of the movement of the terminal devices. The correlation can be identified by a machine learning algorithm and/or an analytical algorithm.

In some embodiments of method 100, when updating the clusters or predetermining the clusters, the server determines additionally respective validity durations of the clusters and so the duration of each epoch. The validity durations may be determined based on the dynamicity of the movement of the terminal devices, and may consider all related factors when determining the clusters, such as the context related data, the GNSS information, the criteria of cluster's accuracy. The server determines transmission patterns in a validity duration, and may not update the transmission patterns during this duration. The validity durations are associated with the transmission patterns of the terminal devices and provided to the terminal devices. During the validity durations, the terminal device may deem that the transmission pattern is valid and not changed for this duration. For some terminal devices that do not need to transmit GNSS information during the validity duration may go to sleep and save the battery consumption. Other terminal devices knowing the validity duration of the transmission pattern and the included transmission interval may maximize the sleep time in an epoch by waking up only when it is required to collect and transmit GNSS information.

In some embodiments of method 100, after obtaining individual positions of the terminal devices as equal to the position of the cluster to which they are allocated, the server may store the individual positions locally for further use. The server may publish the individual positions to external servers for their applications, such as a web server, a blockchain, an MQTT broker for IoT. The server may provide the individual positions to end users upon requested, for example, if an end user requests to observe the positions of some terminal devices attach to some animals.

Figure 3:
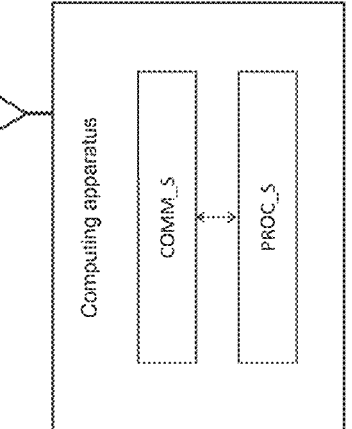
FIG. 3 shows an example implementation of a computing apparatus.

FIG. 3 shows an example implementation of a computing apparatus. The computing apparatus may be configured to carry out various embodiments of method 100 as a server. The computing apparatus comprises a communication unit COMM_S and a processing unit PROC_S. COMM_S may be configured to communication with a plurality of terminal devices. COMM_S may be configured to receive GNSS information sent by the terminal devices according to predetermined transmission patterns and GNSS information sent by the terminal devices at random. COMM_S may be further configured to collect context related data from one or more context sources. PROC_S may be configured to update the set of predetermined clusters based on a part of the context related data, the GNSS information and a predetermined criteria of cluster's accuracy. PROC_S may be further configured to determine respective positions of the clusters based on the GNSS information and the clusters. PROC_S may be further configured to obtain individual positions of the terminal devices according to the respective positions of the clusters.

In some implementations of the computing apparatus, PROC_S may be further configured to update the respective predetermined transmission patterns for the terminal devices based on a part of the context related data and the updated clusters. COMM_S may be further configured to provide the respective updated transmission patterns to the terminal devices.

Further implementations of the computing apparatus become readily apparent from the various implementations described above in conjunction with the method 100.

Figure 4:
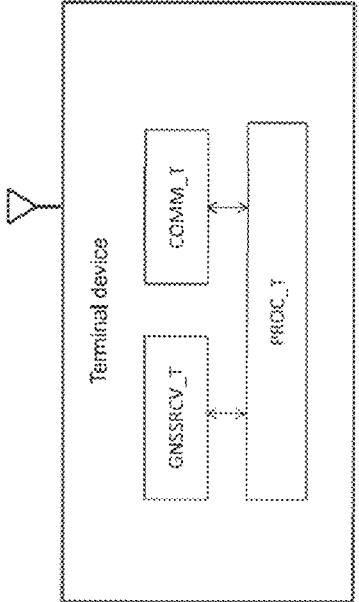
FIG. 4 shows an example implementation of a terminal device.

FIG. 4 shows an example implementation of a terminal device. The terminal device may be configured to carry out various embodiments of method 100. The terminal device comprises a communication unit COMM_T, a GNSS receiver GNSSRCV_T and a processing unit PROC_T. GNSSRCV_T may be configured to receive GNSS information. COMM_T may be configured to receive a respective transmission pattern and transmit the collected GNSS information according to the transmission pattern and at random instructed by PROC_T. PROC_T may be configured to interpret the transmission pattern and instruct COMM_T to transmit GNSS information at assigned times and at random.

Further implementations of the terminal device become readily apparent from the various implementations described above in conjunction with the method 100.

Figure 5:
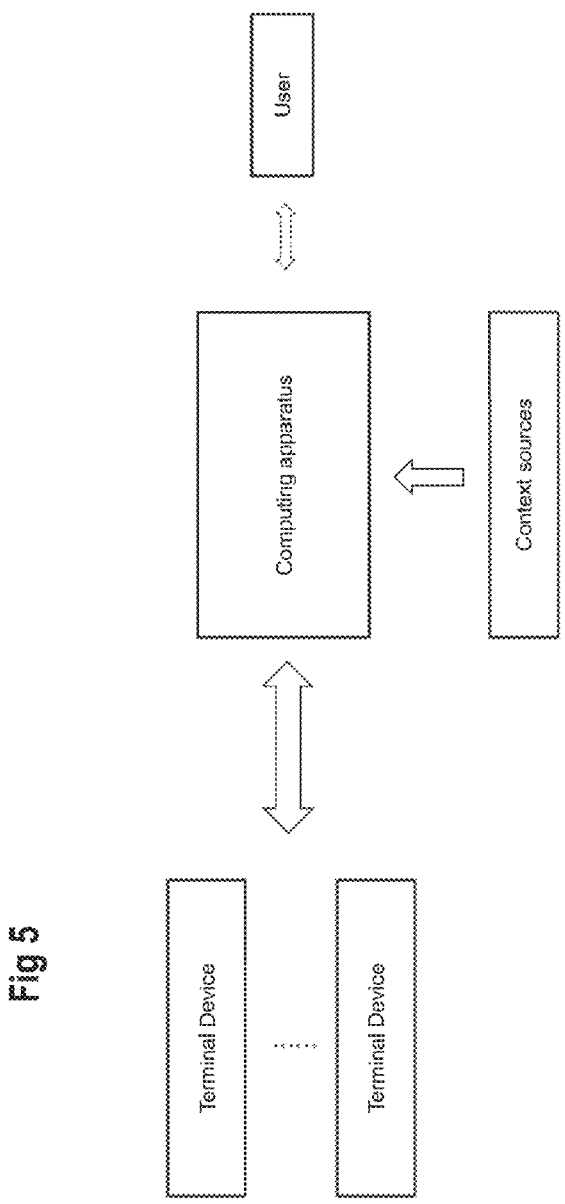
FIG. 5 shows an example implementation of a system.

FIG. 5 shows an example implementation of a system. The system may be configured to carry out various embodiments of method 100. The system may comprise a computing apparatus and a plurality of terminal devices. The computing apparatus communicate with the terminal devices in communication networks such as Bluetooth networks, WiFi networks, Thread networks, LoRaWAN networks, 3GPP-compliant mobile networks, satellite networks. The computing apparatus may be configured to provide transmission patterns and, in some implementations, validity durations to the terminal device. Each of the terminal devices may be configured to transmit GNSS information and, in some implementations, battery levels to the computing apparatus. The system may link to external context sources for the computing apparatus to collect context related data. The system may interact with end users. An end user may set a criteria of cluster's accuracy, for example, a target of the accuracy of the determined individual position to the system, and an importance of battery saving. An end user may request for individual positions from the system.

Implementations of the system become readily apparent from the various implementations described above in conjunction with the computing apparatus and the terminal device.

Various embodiments of the improved concept for determining positions of a plurality of terminal devices by a server can be implemented in the form of logic in software or hardware or a combination of both. The logic may be stored in a computer readable or machine-readable storage medium as a set of instructions adapted to direct one or more processors of a (distributed) computer system to perform a set of steps disclosed in embodiments of the improved concept. The logic may form part of a computer program product adapted to direct an information-processing device to automatically perform a set of steps disclosed in embodiments of the improved concept.

The specification and drawings are, accordingly, to be regarded in an illustrative rather than a restrictive sense. However, it will be evident that various modifications and changes may be made thereunto without departing from the scope of the invention as set forth in the claims.

LIST OF REFERENCE SIGNS

100 method
101-105 steps
A0, A1, A2, A3, B0, B1, C2, C3 cluster
P1, P2, P3, P4, Q terminal device in clusters
COMM_S, COMM_T communication unit
PROC_S, PROC_T processing unit
GNSSRCV_T GNSS receiver

The invention claimed is:

1. A method for determining positions of a plurality of terminal devices by a server, the method comprising:
   receiving, by the server, from at least one of the plurality of terminal devices wherein each terminal device is allocated to one of predetermined one or more clusters, first global navigation satellite system (GNSS) information according to predetermined transmission patterns of the plurality of terminal devices, and from at least one of the plurality of terminal devices second GNSS information at random;
   collecting, by the server, context related data from one or more context sources that are different from the plurality of terminal devices;

updating, by the server, the set of predetermined one or more clusters by allocating each terminal device to a respective cluster based on at least a part of the context related data and the first and the second GNSS information and a predetermined criteria of cluster's accuracy;
   determining, by the server, based on the first and the second GNSS information and on the updated one or more clusters of the plurality of terminal devices, respective positions of the one or more clusters; and
   obtaining, by the server, individual positions of the plurality of terminal devices according to the respective positions of the one or more clusters.

2. The method according to claim 1, further comprising:
   updating, by the server, based on at least a part of the context related data and the updated one or more clusters, the respective predetermined transmission patterns for at least one of the plurality of terminal devices for transmitting the first GNSS information; and
   providing, by the server, the respective updated transmission patterns to each of the at least one of the plurality of terminal devices.

3. The method according to claim 2, wherein updating the respective predetermined transmission patterns for at least one of the plurality of terminal devices comprises:
   receiving, by the server, in addition to the first or the second GNSS information, battery levels of at least one of the plurality of terminal devices; and
   updating, by the server, based on at least a part of the context related data, on the updated one or more clusters and on the battery levels, the respective predetermined transmission patterns for at least one of the plurality of terminal devices.

4. The method according to claim 2, further comprising:
   receiving, by the server, third GNSS information, from the plurality of terminal devices; and
   predetermining, by the server, the predetermined one or more clusters and the predetermined transmission patterns of the plurality of terminal devices based on at least a part of the context related data and the third GNSS information.

5. The method according to claim 1, wherein the context related data include data of at least one of: GNSS assistance, GNSS augmentation, maps, weather, news, social rules, threats or owner instructions, from the one or more context sources including at least one of: content providers in the Internet, end users, global navigation satellite systems.

6. The method according to claim 1, wherein updating the one or more clusters of the plurality of terminal devices comprises:
   identifying, by the server, a correlation between at least a part of the context related data and the first and the second GNSS information using at least one of a machine learning algorithm or an analytical algorithm.

7. The method according to claim 1, wherein updating the set of predetermined one or more clusters comprises:
   determining, by the server, respective validity durations for at least one of the updated one or more clusters;
   associating, by the server, the respective validity durations with the transmission patterns of the terminal devices of the at least one of the one or more clusters; and
   providing, by the server, in addition to the transmission patterns, associated validity durations to the terminal devices of the at least one of the one or more clusters.

8. The method according to claim 1, wherein the transmission pattern of each of the plurality of terminal devices includes at least a transmission interval for transmitting the first GNSS information.

9. The method according to claim 1, wherein the criteria of cluster's accuracy is a target of the accuracy of the determined individual position set by an end user.

10. The method according to claim 1, wherein obtaining, by the server, individual positions of the plurality of terminal devices according to the positions of the one or more clusters comprises at least one of the following:

storing, by the server, the individual positions of the plurality of terminal devices;

publishing the individual positions of the plurality of terminal devices to an external server; or providing the individual positions of the plurality of terminal devices to an end user on demand.

11. A computing apparatus, comprising:

a processing unit and a communication unit for communicating with a plurality of terminal devices, wherein the communication unit is configured to:

receive from at least one of the plurality of terminal devices wherein each terminal device is allocated to one of predetermined one or more clusters, first global navigation satellite system (GNSS) information according to predetermined transmission patterns of the plurality of terminal devices, and receive from at least one of the plurality of terminal devices second GNSS information at random;

collect context related data from one or more context sources that are different from the plurality of terminal devices;

and wherein the processing unit is configured to:

update the set of predetermined one or more clusters by allocating each terminal device to a respective cluster based on at least a part of the context related data and the first and the second GNSS information and a predetermined criteria of cluster's accuracy;

determine, based on the first and the second GNSS information and on the updated one or more clusters of the plurality of terminal devices, respective positions of the one or more clusters; and obtain individual positions of the plurality of terminal devices according to the respective positions of the one or more clusters.

12. The computing apparatus according to claim 11, wherein the processing unit is further configured to:

update based on at least a part of the context related data and the updated one or more clusters, the respective predetermined transmission patterns for at least one of the plurality of terminal devices for transmitting the first GNSS information; and the communication unit is further configured to:

provide the respective updated transmission patterns to each of the at least one of the plurality of terminal devices.

13. A system comprising a computing apparatus according to claim 11, and a plurality of terminal devices, each configured to:

receive a respective transmission pattern;

collect GNSS information; and transmit the collected GNSS information according to the transmission pattern and at random.

14. The system according to claim 13, wherein the computing apparatus and the terminal devices are operable to communicate with each other in at least one of: Bluetooth networks, WiFi networks, Thread networks, LoRaWAN networks, 3GPP-compliant mobile networks, or satellite networks.

15. An apparatus comprising one or more tangible, non-transitory, computer-readable media storing instructions which, when executed by one or more processors, cause the one or more processors to perform operations comprising:

collecting context related data from one or more context sources that are different from a plurality of terminal devices, wherein the collecting occurs in response to receiving, from at least one of the plurality of terminal devices wherein each terminal device is allocated to one of predetermined one or more clusters, first global navigation satellite system (GNSS) information according to predetermined transmission patterns of the plurality of terminal devices, and from at least one of the plurality of terminal devices second GNSS information at random;

updating the set of predetermined one or more clusters by allocating each terminal device to a respective cluster based on at least a part of the context related data and the first and the second GNSS information and a predetermined criteria of cluster's accuracy;

determining based on the first and the second GNSS information and on the updated one or more clusters of the plurality of terminal devices, respective positions of the one or more clusters; and obtaining individual positions of the plurality of terminal devices according to the respective positions of the one or more clusters.

16. The apparatus according to claim 15 wherein the operations further comprise:

updating based on at least a part of the context related data and the updated one or more clusters, the respective predetermined transmission patterns for at least one of the plurality of terminal devices for transmitting the first GNSS information; and providing the respective updated transmission patterns to each of the at least one of the plurality of terminal devices.

17. The apparatus according to claim 16, wherein updating the respective predetermined transmission patterns for at least one of the plurality of terminal devices comprises:

receiving in addition to the first or the second GNSS information, battery levels of at least one of the plurality of terminal devices; and updating based on at least a part of the context related data, on the updated one or more clusters and on the battery levels, the respective predetermined transmission patterns for at least one of the plurality of terminal devices.

18. The apparatus according to claim 16, wherein the instructions further comprise:

receiving third GNSS information, from the plurality of terminal devices; and predetermining the predetermined one or more clusters and the predetermined transmission patterns of the plurality of terminal devices based on at least a part of the context related data and the third GNSS information.

19. The apparatus according to claim 15, wherein the context related data include data of at least one of: GNSS assistance, GNSS augmentation, maps, weather, news, social rules, threats or owner instructions, from the one or more context sources including at least one of: content providers in the Internet, end users, global navigation satellite systems.

20. The apparatus according to claim 15, wherein updating the one or more clusters of the plurality of terminal devices comprises:

identifying a correlation between at least a part of the context related data and the first and the second GNSS information using at least one of a machine learning algorithm or an analytical algorithm.

* * * * *